United States Patent
Embrechts et al.

(10) Patent No.: US 10,911,950 B2
(45) Date of Patent: Feb. 2, 2021

(54) ELECTRONIC DEVICE, SYSTEM AND METHOD FOR DATA COMMUNICATION

(71) Applicant: Sony Corporation, Tokyo (JP)

(72) Inventors: Hugo Embrechts, Stuttgart (DE); Dimitri Torfs, Stuttgart (DE); Conor Aylward, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 31 days.

(21) Appl. No.: 16/105,465

(22) Filed: Aug. 20, 2018

(65) Prior Publication Data

US 2019/0058994 A1    Feb. 21, 2019

(30) Foreign Application Priority Data

Aug. 21, 2017  (EP) .................................. 17187072

(51) Int. Cl.
*H04W 12/06* (2009.01)
*H04W 76/14* (2018.01)
(Continued)

(52) U.S. Cl.
CPC ............ *H04W 12/06* (2013.01); *G06F 21/32* (2013.01); *H04L 63/0861* (2013.01);
(Continued)

(58) Field of Classification Search
CPC ....... H04W 12/06; H04W 12/08; H04W 4/80; H04W 4/21; H04W 48/02; H04W 48/04;
(Continued)

(56) References Cited

U.S. PATENT DOCUMENTS

2003/0103559 A1*  6/2003  Palm ................. H04L 1/0001
                                                   375/222
2014/0236531 A1*  8/2014  Carter ................ A61B 5/1123
                                                   702/141
(Continued)

FOREIGN PATENT DOCUMENTS

CN      105792198 A    7/2016
EP      3 037 036 A1   6/2016
(Continued)

OTHER PUBLICATIONS

Polamuri, Five Most Popular Similarity Measures Implementation in Python, Apr. 11, 2015, retrieved from https://dataaspirant.com/2015/04/11/five-most-popular-similarity-measures-implementation-in-python/ on Sep. 21, 2019 (Year: 2015).*

(Continued)

*Primary Examiner* — George Eng
*Assistant Examiner* — Jing Gao
(74) *Attorney, Agent, or Firm* — Xsensus LLP

(57) ABSTRACT

The present disclosure relates to an electronic device which comprises a circuitry configured to authenticate a second electronic device when the circuitry detects based on a privacy preserving algorithm that the two electronic devices are associated with the same body. Furthermore, the present disclosure relates to a method comprising authenticating data communication between a first electronic device and a second electronic device when detecting based on a privacy preserving algorithm that the two electronic devices are associated with the same body.

19 Claims, 9 Drawing Sheets

(51) Int. Cl.
| | |
|---|---|
| *H04W 4/38* | (2018.01) |
| *H04W 4/80* | (2018.01) |
| *G06F 21/32* | (2013.01) |
| *H04W 12/00* | (2009.01) |
| *H04L 29/06* | (2006.01) |
| *G06F 21/62* | (2013.01) |

(52) U.S. Cl.
CPC .............. *H04W 4/38* (2018.02); *H04W 4/80* (2018.02); *H04W 12/003* (2019.01); *H04W 76/14* (2018.02); *G06F 21/6245* (2013.01); *H04L 2209/46* (2013.01); *H04W 12/00508* (2019.01)

(58) Field of Classification Search
CPC . H04W 84/18; H04W 12/10; H04W 28/0215; H04W 4/02; H04W 4/023; H04W 4/38; H04W 76/14; G06F 21/32; G06F 21/6245; H04L 63/0861; H04L 2209/46
See application file for complete search history.

(56) References Cited

U.S. PATENT DOCUMENTS

| | | | | |
|---|---|---|---|---|
| 2015/0365826 | A1* | 12/2015 | Mancini | ............ A61M 5/14276 713/155 |
| 2016/0028492 | A1* | 1/2016 | Triantafillou | ......... H04W 84/18 726/3 |
| 2016/0250490 | A1* | 9/2016 | Hoffman | ............ A61N 1/37252 607/60 |
| 2018/0019868 | A1* | 1/2018 | Pe'Er | ...................... G06F 21/00 |
| 2018/0211022 | A1* | 7/2018 | Wagner | .................. G06F 21/34 |

FOREIGN PATENT DOCUMENTS

| | | | | |
|---|---|---|---|---|
| WO | 2013/096954 A1 | 6/2013 | | |
| WO | WO-2013096954 A1 * | 6/2013 | ........... | A61B 5/0028 |
| WO | 2015/088548 A1 | 6/2015 | | |
| WO | WO-2016177673 A1 * | 11/2016 | ......... | H04L 63/0853 |
| WO | WO-2017004489 A1 * | 1/2017 | ............ | H04L 67/22 |

OTHER PUBLICATIONS

Lindell, Y. and Pinkas, B. "Secure Multiparty Computation for Privacy-Preserving Data Mining," The Journal of Privacy and Confidentiality (2009), © 2009 CyLabpp, vol. 1, No. 1, pp. 59-98.
"Secure channel," From Wikipedia, the free encyclopedia, Retrieved from the Internet URL: https://en.wikipedia.org/wiki/Secure_channel, [retrieved on Jul. 25, 2018], pp. 1-3.
Office Action dated Aug. 27, 2020 in European Patent Application No. 18 189 269.6, 5 pages.

* cited by examiner

ELECTRONIC DEVICE, SYSTEM AND METHOD FOR DATA COMMUNICATION

TECHNICAL FIELD

The present disclosure generally pertains to device authentication, in particular frictionless device authentication.

TECHNICAL BACKGROUND

Electronic devices such as smart phones, tablets, smart watches, small wearable devices and the like typically enable various communication links to other electronic devices. For establishing short range communication like Bluetooth communication between two electronic devices, a pairing procedure is to be carried out.

The pairing procedure is typically carried out manually by accessing a pairing mode of the electronic devices while they are arranged next to each other and manually confirming the pairing between the two electronic devices.

In case that one electronic device is used alternately by different persons, for example different family members, the pairing procedure has to be carried out every time the device is handed over to another person for use.

Although there exist techniques for pairing two electronic devices, it is generally desirable to simplify and to automate the pairing procedure.

SUMMARY

According to a first aspect, the disclosure provides an electronic device comprising a circuitry configured to authenticate a second electronic device when the circuitry detects based on a privacy preserving algorithm that the two electronic devices are associated with the same body.

According to a second aspect, the disclosure provides a method comprising authenticating data communication between a first electronic device and a second electronic device when detecting based on a privacy preserving algorithm that the two electronic devices are associated with the same body.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
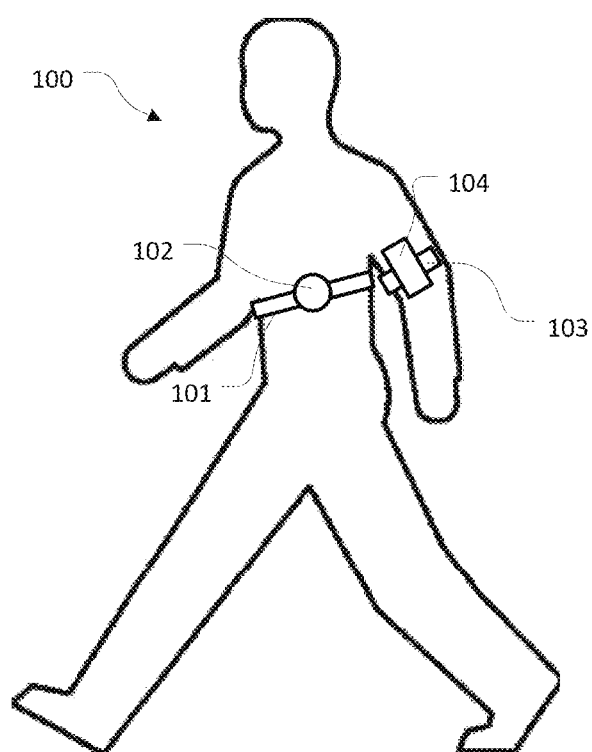
FIG. 1 schematically illustrates a vital monitor and a smart phone attached to a user's body, wherein the vital monitor and the smart phone are to be paired.

Before a detailed description of the embodiments under reference of FIGS. 1 to 9, some general explanations are made.

The present disclosure relates to an electronic device including a circuitry configured to authenticate a second electronic device when the circuitry detects based on a privacy preserving algorithm that the two electronic devices are associated with the same body. The first electronic device and the second electronic device, respectively, may be associated to a body when they are attached to the body, for example when they are worn by a user, when they are implanted in the body or when they are associated to the body in another way. That is, the circuitry of the first electronic device may be configured to authenticate the second electronic device when the circuitry detects that each of the two electronic devices is attached to or implanted in the same body.

The circuitry may include a processor, a memory (RAM, ROM or the like), a storage, input means (mouse, keyboard, camera, etc.), output means (display, e.g. liquid crystal, (organic) light emitting diode, etc., loudspeakers, etc.), a (wireless) interface, etc., as it is generally known for electronic devices (computers, smartphones, etc.). Moreover, it may include sensors for sensing still image or video image data (image sensor, camera sensor, video sensor, etc.), for sensing a fingerprint, for sensing environmental parameters (e.g. radar, humidity, light, temperature), etc.

In some embodiments, the first electronic device may be a wearable electronic device, for example a wearable electronic device of an Internet of Things Application (IoT-Application). For example, the wearable electronic device may not be personalized and possibly shared by different members of a group of people, for example, members of one family, of one fitness center or of another group. The electronic device may be a wearable device for sports performance tracking or a wearable device for health checking as outlined in more detail below.

In some embodiments, the circuitry of the first electronic device may be configured to detect that the first electronic device and the second electronic device are associated with the same body based on a comparison of body-related information. Body-related information may be footprint information (footprint) indicating a characteristic body feature suitable to distinguish various persons. For example, the body-related information may be biometric data indicating a status of a body, for example a body condition, or behaviometric data indicating a behavior of a body.

Based on the body-related information it may be reliably determined whether the two electronic devices are associated with the same body. This enables preventing that the first electronic device authenticates to just any device that is close, for example a device worn by a person that is running along. Thereby it can be avoided that the first electronic device shares its sensor data with the second electronic device if it is not associated with the same body. Thus, the sensor data is kept personal, and the first electronic device cannot be controlled by another person than the one with whom the first electronic device is associated.

The first electronic device may be used in an application area of wearable devices that are not personalized and are possibly shared by various members of a group, since in this case the traditional pairing approach may not be convenient. Alternatively, the first electronic device may be used in an application area where it is desired to achieve a one-time pairing of a personal device with one or more other devices of the user in a frictionless way. The first electronic device may therefore verify at least that the devices with which it pairs are other devices on the same body.

In some embodiments, the circuitry of the first electronic device may be configured to obtain first body-related information from one or more sensors of the first electronic device. The sensors may be sensors configured to gather sensor data from which first body-related information, for example biometric data and/or behaviometric data, can be derived or which itself represent body-related information. The biometric data and/or behaviometric data may then be used as footprint information. For example, the circuitry may include at least one of a sensor for monitoring a physical body condition, for example a heart rate sensor, a heart rate variability monitor, a glucose sensor, a blood pressure sensor, a vital monitor and/or the like, a sensor for monitoring a behavior of the body of the user, for example an automatic gait recognition sensor, a pedometer, a distance sensor, a velocity sensor, an acceleration sensor, a GPS sensor and/or the like, or any other sensor for providing sensor data for deriving biometric data and/or behaviometric data, for example, a microphone, a voice recognition sensor for providing an acoustic fingerprint and/or the like.

The circuitry of the first electronic device may be configured to collect sensor data over a period of time. The first body-related information may be derived from the sensor data collected over the period of time. Alternatively, the circuitry of the electronic device may be configured to continuously collect sensor data. In this case, the first body-related information may be updated based on the continuously collected sensor data. Thus, current body-related information may be provided whenever a new authentication is required.

Preferably, the first body related information may be always calculated on the fly and may not be stored in a permanent memory of the first electronic device. Thus, if the first electronic device is stolen, it may be avoided that the first body-related information is recovered from the stolen first electronic device.

In some embodiments, the circuitry of the first electronic device may be configured to obtain second body-related information from the second electronic device. The second body-related information obtained from the second electronic device may be stored by the second electronic device. Alternatively, the second electronic device may include sensors for providing sensor data, from which the second body-related information may be derived or which represent the second body-related information analogously to the first body-related information obtained from the sensors of the first electronic device as described above.

Thus, the two electronic devices are configured to perform a feature extraction and to calculate biometric data and/or behaviometric data used as footprint information of the body to which the two electronic devices are associated.

In some embodiments, the circuitry of the first electronic device may be configured to communicate with the second electronic device over short range wireless communication. For example, the short range wireless communication may be a Bluetooth Low Energy (BTLE) communication, a near-field communication via electromagnetic induction or any other short range wireless communication.

Alternatively or additionally, the circuitry of the first electronic device may be configured to communicate with the second electronic device over wide range wireless communication. For example, the wide range wireless communication may be a Long Term Evolution (LTE) communication, a Worldwide Interoperability for Microwave Accessor (WiMAX) communication or any other wide range wireless communication.

In some embodiments, the circuitry of the first electronic device may be configured to obtain second body-related information from the second electronic device by short range wireless communication and/or a wide range wireless communication. Specifically, the second body-related information itself and/or encrypted second body-related information may be obtained by short range wireless communication and/or a wide range wireless communication.

In some embodiments, the circuitry of the first electronic device may be configured to determine if first body-related information obtained from sensors of the first electronic device and second body-related information obtained from the second electronic device match. That is, the derived first body-related information and the obtained second body-related information or in some cases the sensor data representing the first body-related information and the second body-related information can be compared to each other.

In some embodiments, the circuitry of the first electronic device may be configured to authenticate the second electronic device if first body-related information obtained from sensors of the first electronic device and second body-related information obtained from the second electronic device match. In this case, it is assumed that the two electronic devices are associated with the same body. Furthermore, the circuitry may be configured to deny authenticating of the second electronic device if first body-related information obtained from sensors of the electronic device and second body-related information obtained from the second electronic device do not match. In this case, it is assumed that the second electronic device is associated with the body of another person and not with the body with which the first electronic device is associated.

Thus, the authentication between the two electronic devices may succeed when they detect based on the privacy preserving algorithm that they are associated with the same body. If the comparison of the first body-related information and the second body-related information confirms that both devices have a metric measurement that is close enough to one another, it is concluded that both electronic devices are associated with the same body, for example attached to the same body. After successful authentication, sensor data and/or body-related information or any other data may be exchanged freely over the established channel between the two electronic devices. However, preferably no personal data is exchanged until the authentication succeeds.

In some embodiments, the circuitry of the first electronic device may be configured to correlate first body-related information obtained from sensors of the first electronic device with second body-related information obtained from the second electronic device. For example, the circuitry may be configured to calculate a correlation factor indicating a distance between the first body-related information and the second body-related information and to determine whether the distance is less than a threshold. If the distance is less than the threshold, the second electronic device is authenticated. The threshold may be the maximum distance allowed between the first body-related information and the second body-related information for successful authentication.

The circuitry may in some cases compare the distance to more than one threshold. Each of these thresholds may determine a level of access. That is, if the circuitry determines that the distance is less than at least one of the multiple thresholds, authentication succeeds. However, a level of access is different dependent on the threshold. Specifically, compliance with a first threshold may allow access to less valuable resources or data than compliance with a second threshold stricter, e.g., smaller, than the first threshold.

In some embodiments, the circuitry of the first electronic device may be configured to detect if first body-related information obtained from sensors of the first electronic device and second body-related information obtained from the second electronic device relate to a common characteristic body feature, for example a common biometric feature indicating a body condition or a common behaviometric indicating a behavior of the body. The two electronic devices may detect that they are on the same body by first checking whether they calculate or detect a common behaviometric/biometric. If such common metrics exist, they may determine whether the respective footprints (first and second body-related information) calculated of the metrics are closer to one another than a chosen threshold, and authenticate with each other if the footprints are closer to one another than the threshold.

To determine whether the first body-related information and the second body-related information relate to a common characteristic body feature, the two electronic devices may list their capabilities to calculate or detect a biometric/behaviometric footprint, transfer the list of capabilities to each other, check whether they have one or more capabilities in common and select at least one of the capabilities they have in common.

Preferably, the two electronic devices calculate the body-related information, that is, the footprint, in the same way.

For example, any footprint allowing matching based on a distance measure (e.g. Euclidean) may be used. Each measurement of such a metric typically results in a point in a multi-dimensional space. Two measurements are assumed to identify the same person if the corresponding points are closer to one another than a certain chosen threshold.

In some embodiments, the circuitry of the first electronic device may be configured to exchange body-related information with the second electronic device using the privacy preserving algorithm, preferably by performing a privacy preserving biometric footprint comparison. Specifically, the privacy preserving algorithm may be an algorithm adapted to calculate a Euclidean distance of the two metrics (first and second body-related information). Various algorithms exist, having different security properties. For example, a secured multi-party computation algorithm (MPC-algorithm) or any other privacy preserving algorithm may be used. This enables the circuitry of the first electronic device to decide based on the first body-related information and the second body-related information whether to pair the two electronic devices without transmitting the first body-related information (footprint) provided by the first electronic device to the second electronic device and without receiving, at the first electronic device, the second body-related information (footprint) from the second electronic device.

In some embodiments the circuitry of the electronic device may be configured to exchange body-related information based on a Secure Multi-Party Computation algorithm (MPC algorithm). Specifically, the two electronic devices may be configured to confirm whether the distance between their metrics is smaller than a threshold chosen as required for a successful authentication by performing a Secure Multi-Party Computation algorithm amongst themselves which confirms whether or not the distance between their respective footprints is smaller than this threshold. During the computation, the metric values themselves are not exchanged. If multiple thresholds have been chosen corresponding to different levels of access, the MPC algorithm may be repeated for each threshold level.

For example, the circuitry of the electronic device may be configured to exchange body-related information based on Yao's protocol. According to Yao's protocol the first electronic device and the second electronic device may execute a transfer stage. Afterwards, the first electronic device may send a description of a garbled circuit like a function $f(x, \bullet)$ and corresponding garbled values. The second electronic device has information sufficient to compute a function $f(x; y)$. After computing $f(x; y)$, the second electronic device may send this function to the first electronic device. The second electronic device computes whether the first body-related information matches with the second body-related information. The function $f(x; y)$ is a distance function and x and y are the first and the second body-related information.

In some embodiments, the circuitry of the first electronic device may be configured to sense data representing a permanent feature and/or a current state of a user's body. That is, the sensed data may be used to determine a body-related information which does not change over time or a body-related information which is time-dependent and has to be continuously updated, like a heart rate variation, an acceleration or the like.

Before determining whether the first body-related information obtained from the first electronic device and second body-related information obtained from the second electronic device relate to a common characteristic body feature and/or determining whether the two electronic devices are associated with the same body, the circuitry may be configured to establish a secure channel to the second electronic device. That is, the two electronic devices may establish a secure channel by agreeing a session key using a known secure protocol. Subsequently, all further communication between the two electronic devices may be performed over this channel.

After authentication of the two electronic devices, the circuitry may be configured to exchange a shared key. That is, if there is interest in establishing a permanent pairing between the two electronic devices, they may establish a shared key (one chooses a random key and sends it to the other device over the secure channel) that they can use later to setup a new secure authenticated channel (SAC).

In some embodiments, the electronic device may be one of smart glasses, a smart watch, a smart band, a smart chain, mobile phone, tablet, a small wearable device or any other smart device attachable to a user's body.

The circuitry may also be configured to authenticate one or more additional electronic devices when the circuitry detects based on a privacy preserving algorithm that the first electronic device and the one or more additional electronic devices are associated with the same body. The circuitry can further be configured to inform the second electronic device that the one or more additional electronic devices are associated with the same body so that the second electronic device may authenticate to the one or more additional electronic devices.

The present disclosure further relates to a method including authenticating data communication between a first electronic device and a second electronic device when detecting based on a privacy preserving algorithm that the two electronic devices are associated with the same body, for example attached to or implanted in the same body.

In some embodiments, it may be detected that the first electronic device and the second electronic device are associated with the same body based on a comparison of body-related information. The body-related information may be footprint information (a footprint) indicating a characteristic body feature suitable to distinguish various persons, for example, biometric data or behaviometric data as outlined above.

In some embodiments first body-related information may be obtained from sensors of the first electronic device, for example, from sensors configured to gather sensor data from which first body-related information, for example biometric data and/or behaviometric data, can be derived or which itself represent body-related information, as outlined in detail above.

In some embodiments, second body-related information may be obtained from the second electronic device, wherein the second body-related information may be stored in the second electronic device or derived from sensor data sensed by sensors of the second electronic device, as outlined in detail above.

In some embodiments, a communication between the first electronic device and the second electronic device may be performed over short range wireless communication, for example over a Bluetooth Low Energy (BTLE) communication, a near-field communication via electromagnetic induction or any other short range wireless communication. Alternatively or additionally, a communication between the first electronic device and the second electronic device may be performed over wide range wireless communication, for example over a Long Term Evolution (LTE) communication, a Worldwide Interoperability for Microwave Accessor (WiMAX) communication or any other wide range wireless communication.

In some embodiments, second body-related information may be obtained from the second electronic device by short range wireless communication and/or a wide range wireless communication as outlined in detail above.

In some embodiments, it may be determined if first body-related information obtained from sensors of the electronic device and second body-related information obtained from the second electronic device match. As outlined above, the first body-related information and the second body-related information may be compared to each other.

In some embodiments, data communication between the first electronic device and the second electronic device may be authenticated if first body-related information obtained from sensors of the first electronic device and second body-related information obtained from the second electronic device match. Otherwise, authentication may be denied as outlined in detail above.

In some embodiments, first body-related information obtained from sensors of the first electronic device may be correlated with second body-related information obtained from the second electronic device. Specifically, a correlation factor indicating a distance between the first body-related information and the second body-related information may be determined and the correlation factor may be compared to a threshold as described above.

In some embodiments, it may be detected if first body-related information obtained from sensors of the electronic device and second body-related information obtained from the second electronic device relate to a common characteristic body feature as outlined in detail above.

In some embodiments, body-related information between the first electronic device and the second electronic device may be exchanged using the privacy preserving algorithm, for example an MPC algorithm or the like as described in detail above.

In some embodiments, body-related information between the first electronic device and the second electronic device may be exchanged based on a MPC algorithm as outlined above in detail.

In some embodiments, data representing a permanent feature and/or a current state of a user's body are sensed as described above.

In some embodiments, a secure channel may be established between the first electronic device and the second electronic device.

All method features described with respect to the first electronic device and the second electronic device above represent also features of the method itself.

The present disclosure further relates to a computer program including instructions, the instructions when executed by a processor causing the processor to authenticate data communication between a first electronic device and a second electronic device when detecting that the two electronic devices are associated with the same body. Preferably, the computer program may include instructions, the instructions when executed by a processor causing the processor to perform the above-described method for authenticating data communication between a first electronic device and a second electronic device.

The methods as described herein are also implemented in some embodiments as a computer program causing a computer and/or a processor to perform the method when being carried out on the computer and/or processor. In some embodiments, also a non-transitory computer-readable recording medium is provided that stores therein a computer program product, which, when executed by a processor, such as the processor described above, causes the methods described herein to be performed.

In the following, a detailed description of the embodiments under reference of FIGS. 1 to 9 is provided.

FIG. 1 shows a walking person 100. The person 100 carries around his chest a chest strap 101 and a first electronic device in the form of a vital monitor 102 attached to the chest strap 101. The vital monitor 102 is configured to provide first body-related information characterizing a body to which the wearable device is attached (here the body of the person 100). The vital monitor 102 is an example of a wearable device for sports performance tracking and/or for health checking whose main functionality is to gather biometric data such as a heart rate, a glucose level, a blood pressure and others as body-related information.

The person 100 further carries around his upper arm a sport armband 103 with a pocket (not shown) and a second electronic device in the form of a smart phone 104 inserted in the pocket. The smart phone 104 is configured to provide second body-related information characterizing the body of the user (here the person 100) of the smart phone 104 such as biometric data of the person 100.

The vital monitor 102 and the smart phone 104 are configured to transfer data over a Bluetooth Low Energy (BTLE) communication.

The vital monitor 102 and the smart phone 104 are attached to the same body, and it is therefore desired that the vital sensor 102 authenticates the smartphone 104.

Figure 2:
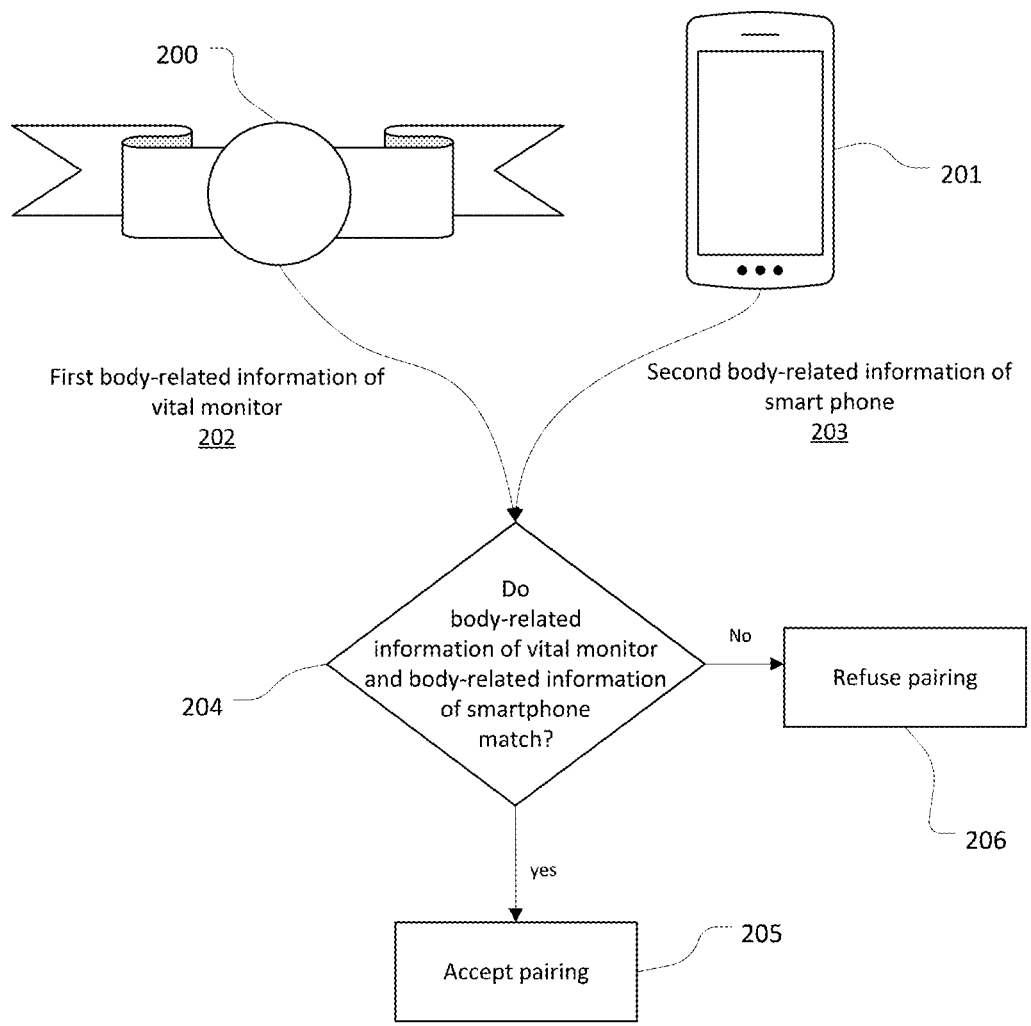
FIG. 2 schematically illustrates a general method for pairing the vital monitor and the smart phone.

FIG. 2 schematically shows a flow diagram of a method for pairing a vital monitor 200 and a smart phone 201 when the vital monitor 200 and the smart phone 201 are attached to the same body, as the vital sensor 102 and the smart phone 104 of FIG. 1.

The vital monitor 200 continuously derives first body-related information from sensed data and provides them at 202. In a similar way, the smart phone 201 continuously derives second body-related information from sensed data and provides them at 203.

At 204 the vital monitor 200 and also the smart phone 201 detect using a privacy preserving algorithm whether the first body-related information output by the vital monitor 102 and the second body-related information output by the smart phone 104 match.

In the case that the first body-related information output by the vital monitor 102 and the second body-related information 201 output by the smart phone 104 match, it is assumed that the vital monitor 200 and the smart phone 201 are attached to the same body, for example to the body of the person 100 in FIG. 1, and pairing of the vital monitor 200 and the smart phone 201 is accepted at 205.

Otherwise, in the case that the first body-related data 200 output by the vital monitor 102 and the second body-related data 201 output by the smart phone 104 do not match, it is assumed that the vital monitor 200 and the smart phone 201 are attached to bodies of different persons. In this case, paring of the vital monitor 200 and the smart phone 201 is refused at 206. When another (smart) device approaches, or is detected by, the vital monitor 200 or the smart phone 201, the pairing procedure is repeated analogously for the approaching smart device and the respective one of the vital monitor 200 and the smart phone 201.

The pairing is based solely on the derived first body-related information and the second body-related information, respectively. A manual confirmation of the pairing is not required, that is, there is no need for entering passwords, performing biometric checks or other actions from the user. The two electronic devices collaboratively authenticate the user using data inputs gathered from sensors.

In summary, the method enables a first electronic device to establish communication with another device of the same user in a frictionless way, but to avoid establishing communication with devices of other users that are close, e.g. with a device worn by a person that is running along. Thus, personal data can be prevented from being shared with a device controlled by another person. For example, wearable devices that are not personalized and are possibly shared in the family can be automatically authenticated to a personal device like a smart phone of a current user. Alternatively, the method can be applied to achieve a one-time pairing of a personal device with another device of the same user in a frictionless way.

Figure 3:
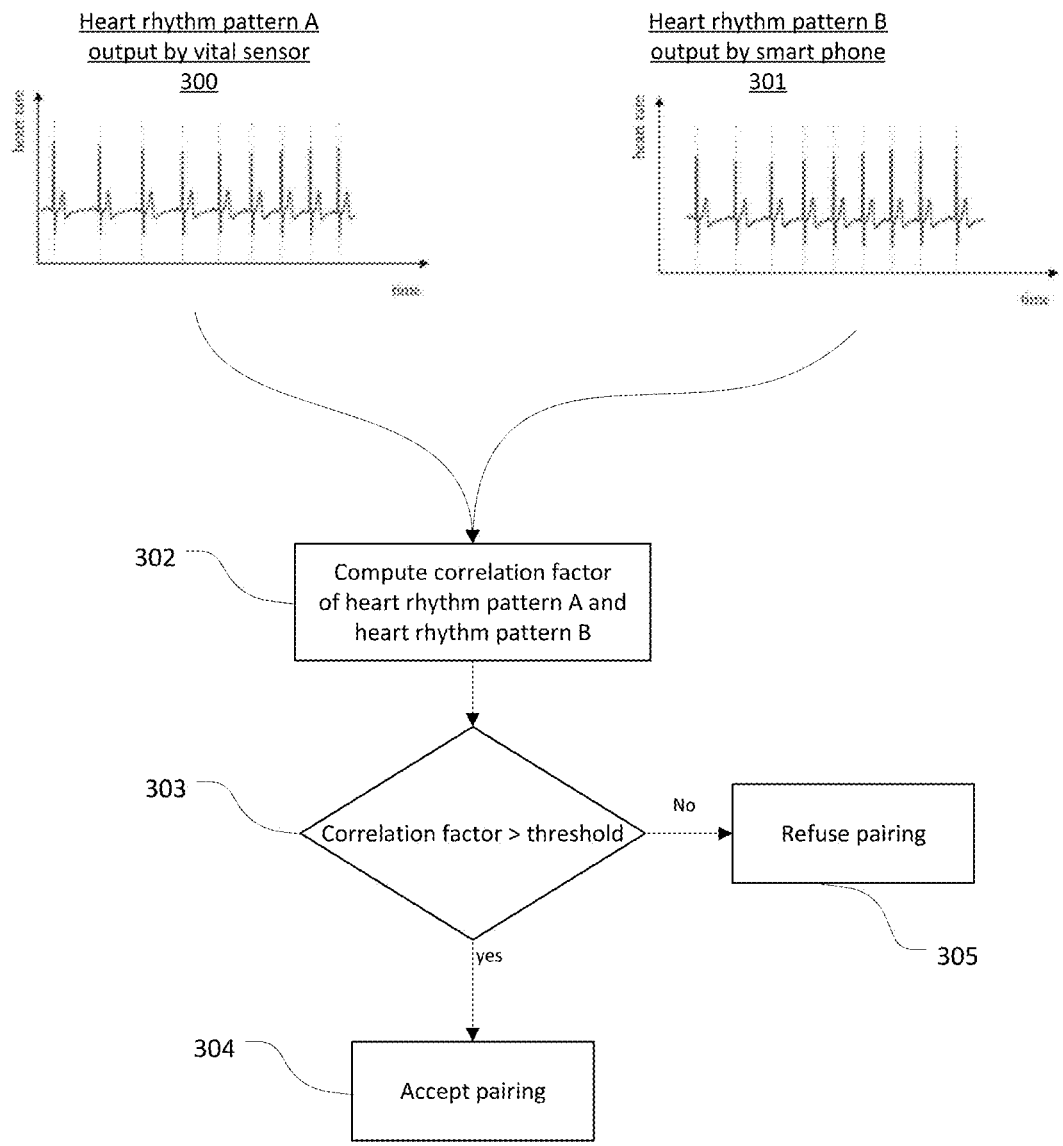
FIG. 3 schematically illustrates a method for pairing the vital monitor and the smart phone based on heart rhythm patterns.

FIG. 3 schematically illustrates a flow diagram of a method for pairing a vital monitor and a smart phone, for example the vital monitor 102 and the smart phone 104 of FIG. 1, based on heart rhythm patterns. Both the vital monitor and the smart phone include a heart rate sensor and are configured to generate a heart rhythm pattern. Each heart rate pattern represents a characteristic pattern, that is, a temporary footprint, of the person who is in contact with the heart rate sensor.

At 300 the vital monitor provides a heart rhythm pattern A as first body-related information. At 301 the smart phone provides a heart rhythm pattern B as second body-related information.

At 302 a "biometric measurement" is derived from each of the heart rhythm pattern A and the a heart rhythm pattern B. This biometric measurement is a point in a multi-dimensional space and the Euclidian distance between the two biometric measurements is a measure for the correlation between the two heart rhythm pattern A, B, that is a correlation factor $F_C$. Alternatively, an MPC algorithm may be used to calculate the correlation between the two heart rhythm pattern A, B directly. The correlation factor $F_C$ provides a measure for a degree of a statistical relationship between the heart rhythm patterns A and B. Here, the correlation factor is a number between 0 and 1, where the highest correlation is represented by a correlation factor $F_C$ of $F_C=1$.

At 303 the correlation factor $F_C$ is compared to a threshold T. A result of this comparison indicates a probability that the smart devices, here the vital monitor and the smart phone, are attached to the body of the same person. Here, the threshold T is for example T=0.95.

In the case that the correlation factor $F_C$ is higher than the threshold T, it is assumed that the vital monitor and the smart phone are attached to the same body and pairing of the vital monitor and the smart phone is accepted at 304.

Otherwise, in the case that the correlation factor $F_C$ is equal to or smaller than the threshold T, it is assumed that the vital monitor and the smart phone are attached to bodies of different persons. In this case, paring of the vital monitor and the smart phone is refused at 305.

In other words, if the above comparison confirms that both devices provide a metric measurement in form of heart rhythm patterns that is close enough to one another, it is concluded that both devices are on the same body. From here data can be exchanged freely over an established channel between the two devices. Thus, it can be verified at least that the two electronic devices which pair with each other are on the same body.

Figure 4:
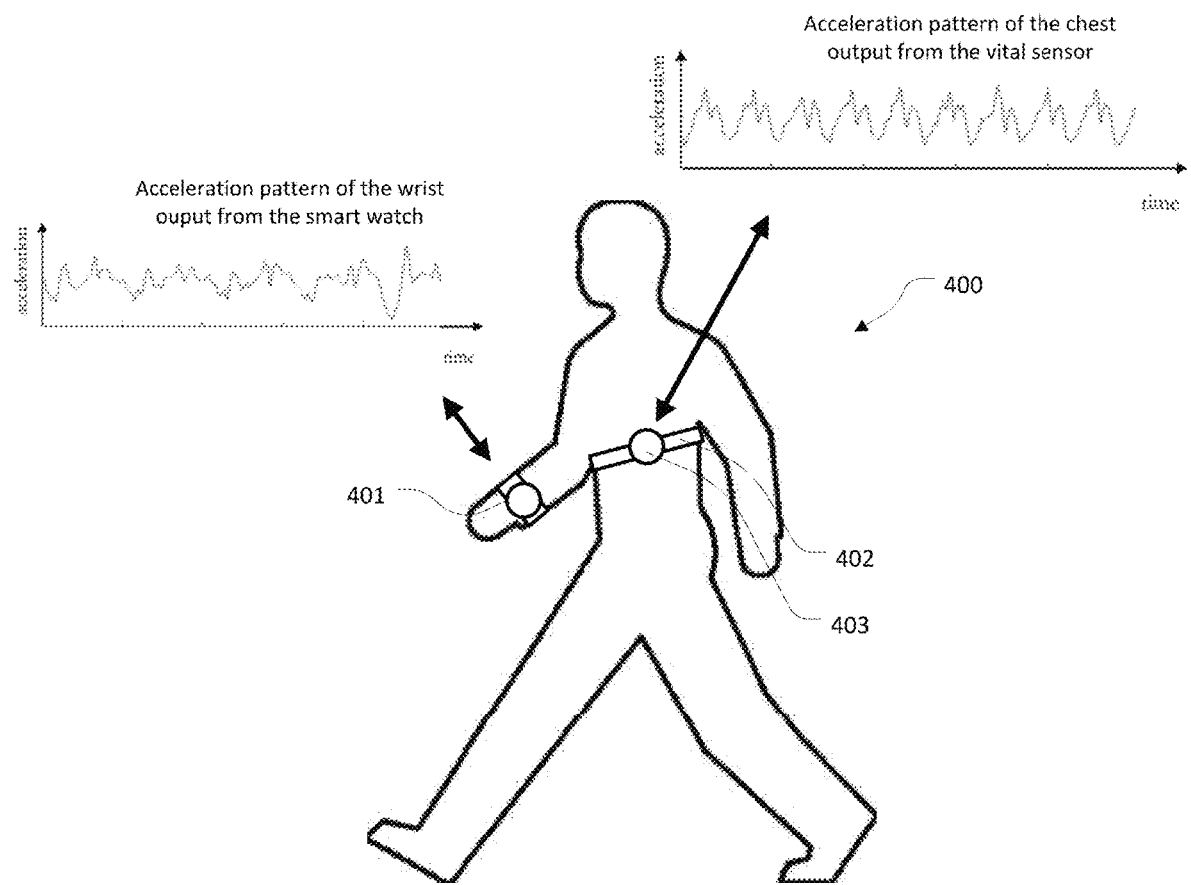
FIG. 4 schematically illustrates a vital monitor and a smart watch attached to a user's body, wherein the vital monitor and the smart phone are to be paired.

FIG. 4 illustrates a walking person 400 who carries around his wrist a smart watch 401. The person 400 further carries around his chest a chest strap 402 and a vital monitor 403 attached to the chest strap 402. The smart watch 401 includes an acceleration sensor configured to sense acceleration data representing the acceleration of a part of the body to which the smart watch is attached, here the person's wrist. The vital monitor 403 also includes an acceleration sensor configured to sense acceleration data representing the acceleration of a part of the body to which the vital monitor 403 is attached, here the person's chest. Each of the smart watch 401 and the vital monitor 403 is configured to generate from the sensed acceleration data an acceleration pattern and to transfer the same over a Bluetooth Low Energy communication to the vital monitor 403 and the smart watch 401, respectively.

Figure 5:
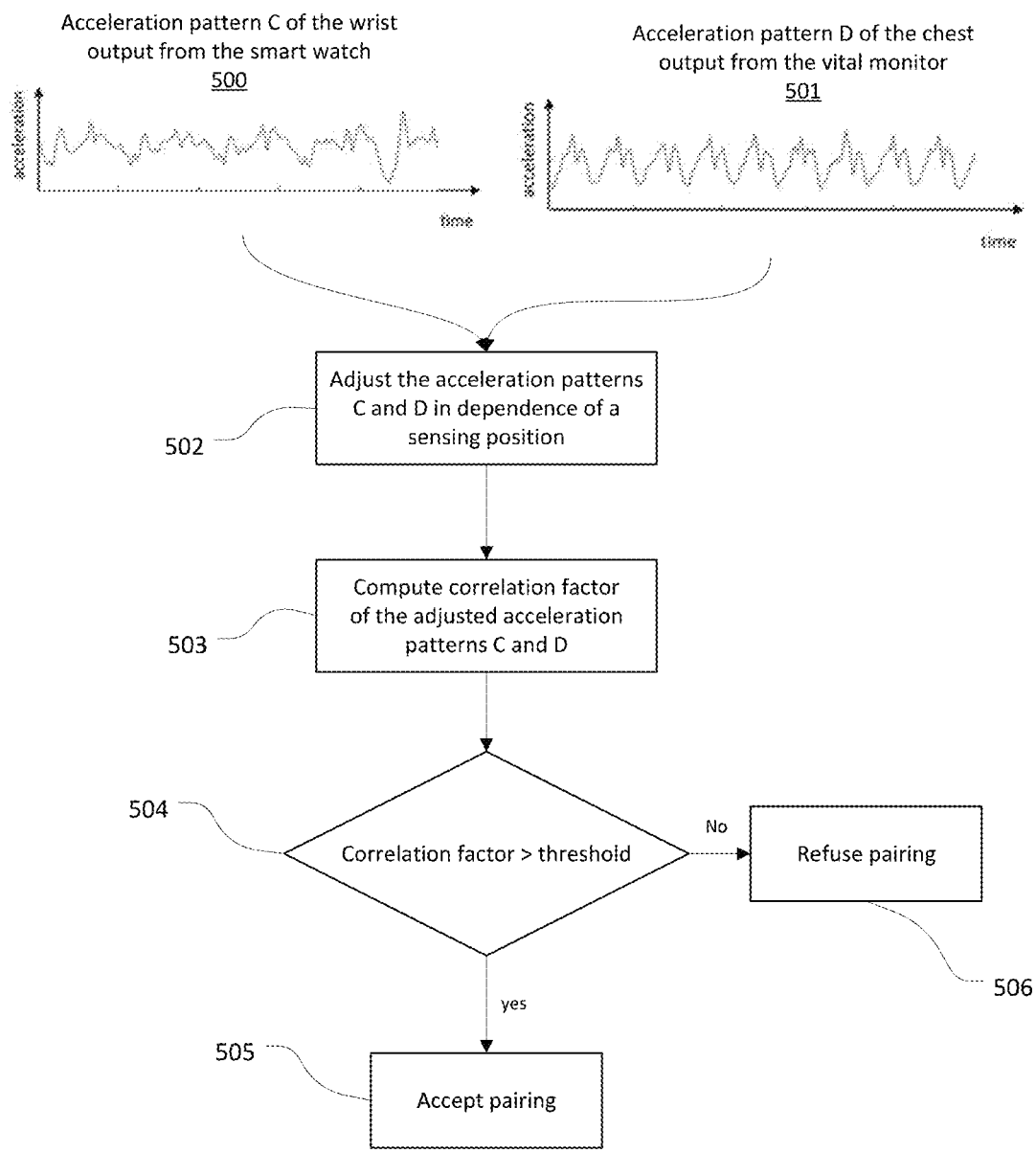
FIG. 5 schematically illustrates a method for pairing the vital monitor and the smart phone based on acceleration patterns.

The flow diagram of FIG. 5 illustrates a method for pairing two wearable devices, here the smart watch 401 and the vital monitor 403, on the basis of acceleration patterns. At 500 the smart watch provides an acceleration pattern C of the wrist. At 501 the vital monitor provides an acceleration pattern D of the chest.

At 502 the acceleration pattern C at the wrist and the acceleration pattern D at the chest are adjusted on the basis of the position of the smart watch and the position of the vital monitor, so as to enable a comparison of the acceleration patterns C and D.

At 503 a correlation factor $F_C$ representing the correlation of the adjusted acceleration pattern C and the adjusted acceleration pattern D is computed using a privacy preserving algorithm. The correlation factor $F_C$ provides analog to the example above a measure for a degree of a statistical relationship between the acceleration patterns C and D. Here, the correlation factor is again a number between 0 and 1, where the highest correlation is represented by a correlation factor $F_C$ of $F_C=1$.

At 504 the correlation factor is compared to a threshold T. A result of this comparison indicates the probability that the smart devices, here the smart watch and the vital monitor, are attached to the body of the same person. Here, the threshold T may be again T=0.95.

In the case that the correlation factor $F_C$ is higher than the threshold T, it is assumed that the smart watch and the vital monitor are attached to the same body and pairing of the smart watch and the vital monitor is accepted at 505.

Otherwise, in the case that the correlation factor $F_C$ is equal to or smaller than the threshold T, it is assumed that the smart watch and the vital monitor are attached to bodies of different persons. In this case, paring of the smart watch and the vital monitor is refused at 506.

Figure 6:
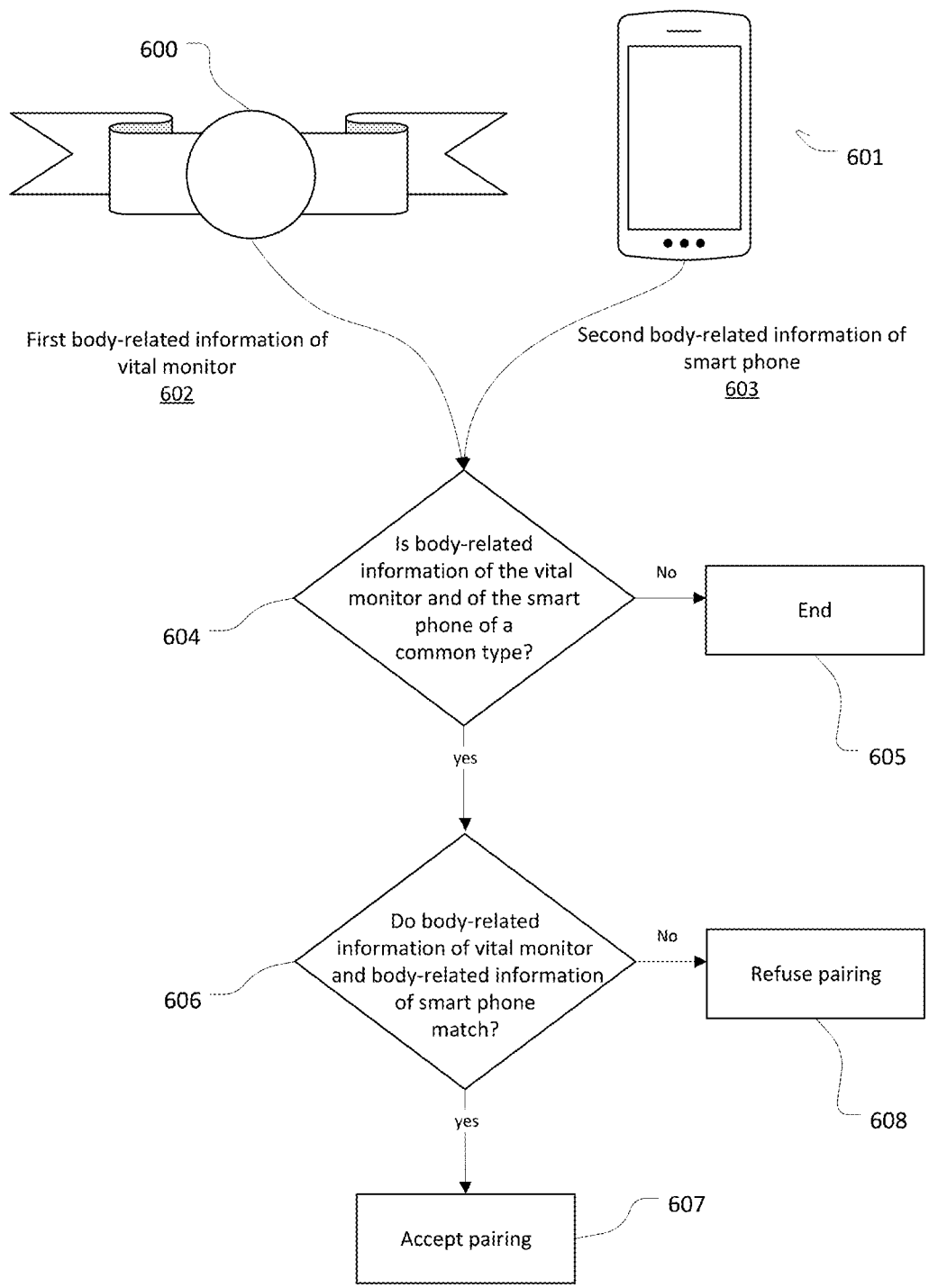
FIG. 6 schematically illustrates a method for pairing the vital monitor and the smart phone using body-related information of a common characteristic body feature.

FIG. 6 schematically illustrates a method for pairing the vital monitor and the smart phone using body-related information of a common characteristic body feature. Compared to the method described with respect to FIG. 2, this method includes detecting whether the first body-related information and the second body-related information represent or comprise a common characteristic body feature using a privacy preserving algorithm.

After the first body-related information is provided by the vital monitor 600 at 602 and the second body-related information is provided by the smart phone 600 at 603, it is detected at 604 whether the first body-related information and the second body-related information represent a common characteristic body feature, that is, a common type of information on a body. This may be, for example, the case if the vital monitor and the smart phone include sensors of the same type.

If it is detected that the first body-related information and the second body-related information represent different characteristic body features, the process is ended and pairing is refused at 605.

Otherwise, if it is detected that the first body-related information and the second body-related information represent similar characteristic body features, it is detected at 606 whether the first body-related information output by the vital monitor 600 and the second body-related information output by the smart phone 601 match, in an analogous way as at 204 in FIG. 2.

Figure 7:
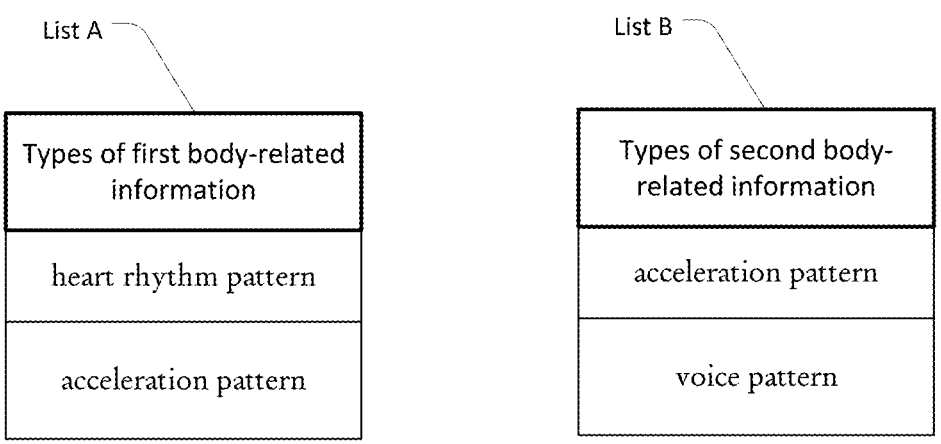
FIG. 7 shows lists of characteristic body features represented by the first and second body-related information.

For detecting whether the first body-related information and the second body-related information represent a common characteristic body feature, each of the vital monitor 600 and the smart phone 601 transfers a list indicating types of first body-related information and second body-related information they measure or derive. FIG. 7 shows a list A of the vital monitor 600, which derives a heart rhythm pattern and an acceleration pattern, and a list B of the smart phone 601, which derives an acceleration pattern and a voice pattern. Thus, both the vital monitor 600 and the smart phone 601 provide acceleration patterns, and thus pairing based on the acceleration pattern as described with respect to FIGS. 4 and 5 can be performed.

In summary, the wearable devices send one another a list of capabilities and select one they have in common.

Figure 8:
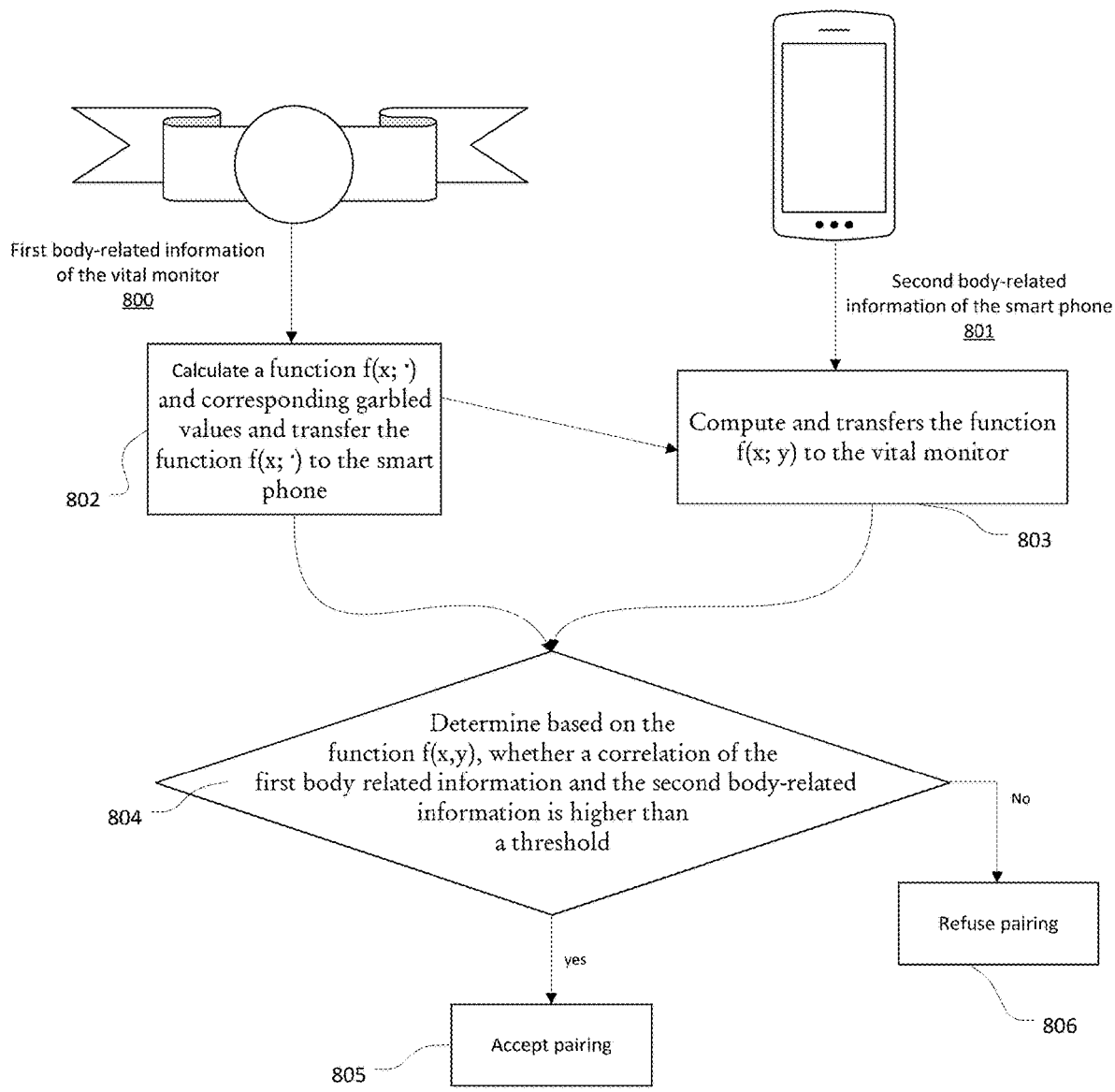
FIG. 8 schematically illustrates a general method for pairing the vital monitor and the smart phone using a privacy preserving algorithm.

FIG. 8 schematically illustrates a general method for pairing the vital monitor and the smart phone using a privacy preserving algorithm. A scenario as illustrated in FIG. 2 serves a background.

As outlined above, the vital monitor provides first body-related information at 800 and the smart phone provides second body-related information at 801.

At 802 the vital monitor calculates a description of a garbled circuit in form of the function f(x; •), where x is the first body-related information and corresponding garbled values. Then the vital monitor transfers the function f(x; •) to the smart phone.

At 803 the smart phone computes a function f(x; y), where y is the second body-related information and transfers the function f(x; y) to the vital monitor. Thereby, the smart phone does not see the first body-related information.

At 804, the vital monitor determines, whether a correlation of the first body related information of the vital monitor and the second body-related information of the smart phone is higher than a threshold. Thereby, the vital monitor does not see the second body-related information of the smart phone. The result is provided to the smart phone.

In an analog way, the smart phone calculates the function f(y; •), where y is the second body-related information and corresponding garbled values and transfers the function f(y; •) to the vital sensor. The vital sensor computes a function f(y; x), where x is the first body-related information and transfers the function f(y; x) to the smart phone, which determines, whether a correlation of the first body related information of the vital monitor and the second body-related information of the smart phone is higher than a threshold In the case that the correlation factor is higher than the threshold, it is assumed that the vital monitor and the smart phone are attached to the same body and pairing of the vital monitor and the smart phone is accepted at 805.

Otherwise, in the case that the correlation factor is equal to or smaller than the threshold, it is assumed that the vital monitor and the smart phone are attached to bodies of different persons. In this case, paring of the vital monitor and the smart phone is refused at 806.

In summary, both parties confirm whether the distance between their metrics is smaller than a threshold chosen as required for a successful authentication by performing a Secure Multi-Party Computation algorithm amongst themselves which confirms whether or not the distance between their respective footprints is smaller than this threshold. During the computation the metric values themselves are not exchanged.

Authentication between two electronic devices by a privacy preserving biometric footprint comparison enable the two devices not to provide personal data until the authentication succeeds.

Figure 9:
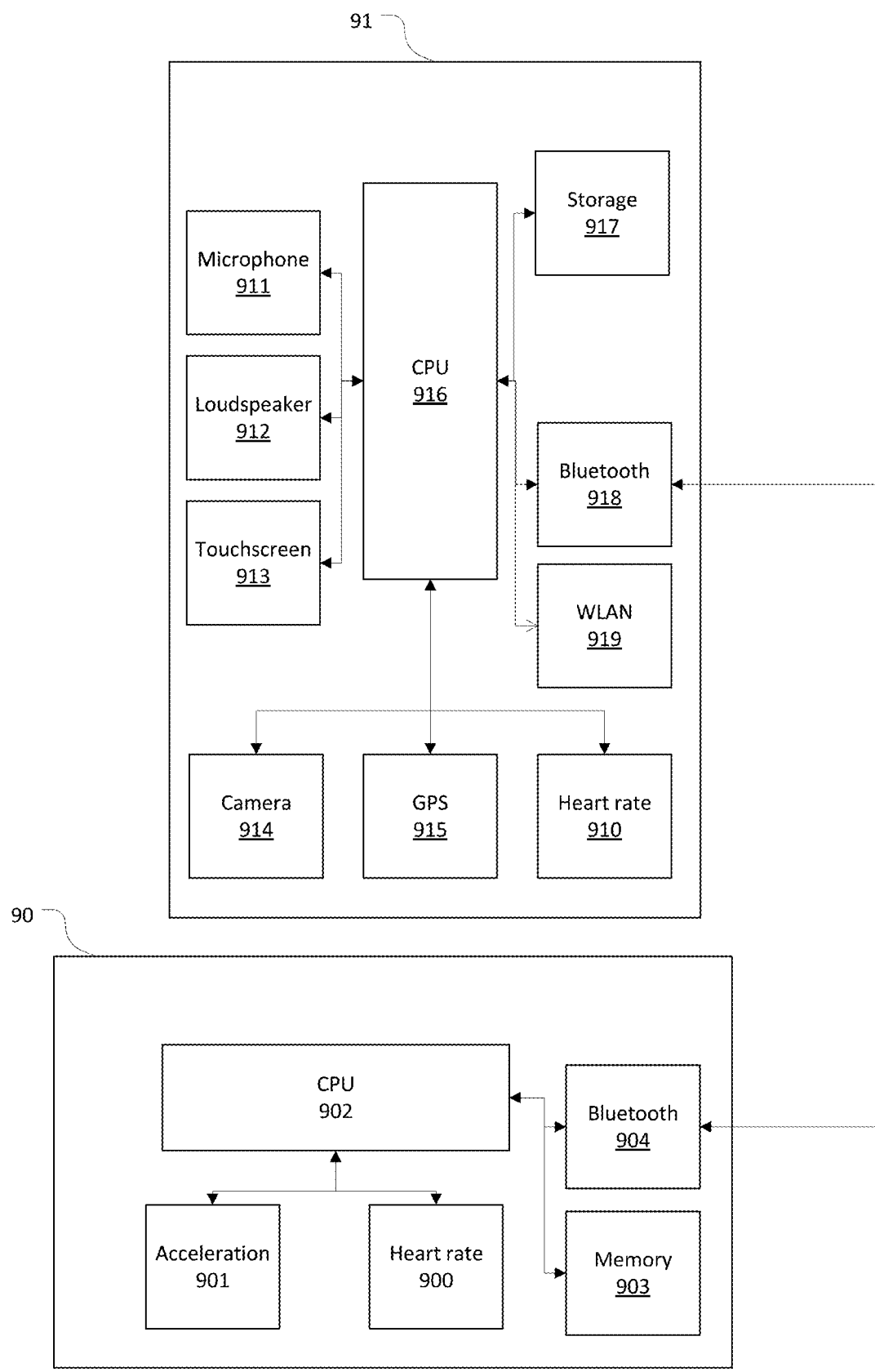
FIG. 9 schematically illustrates the structure of a vital monitor and a smart phone to be paired.

FIG. 9 shows an exemplary structure of a vital monitor 90 and a smart phone 91, which may be paired when they are attached to the same person. The vital monitor 90 includes a heart rate sensor 900 configured to sense a heart rate and an acceleration sensor 901 configured to sense an acceleration. The vital monitor 90 further includes a CPU 902 configured to generate a heart rhythm pattern and an acceleration pattern and to perform a pairing process as described above with respect to the FIGS. 2 to 8 based on information stored in the memory 903. Besides, the vital monitor includes a Bluetooth interface 904 configured to transfer and receiving data to and from the smart phone 91. The smart phone 91 includes an acceleration sensor 910 configured to sense an acceleration and a microphone 911 configured to sense voices. The smart phone 91 further includes loudspeaker 912, a touchscreen 913, a camera 914, a GPS sensor 915. Besides, the smart phone 91 includes a CPU 916 configured to generate an acceleration pattern and to perform the pairing process based on information stored in the memory 917. The CPU 916 further has other typical functions of a CPU of a smart phone. Besides, the smart phone 91 includes a Bluetooth interface 918 configured to transfer and receive data to and from the vital monitor 90. Further, the smart phone includes a WLAN interface 919 configured to perform a communication via a network.

It should be recognized that the embodiments describe methods with an exemplary ordering of method steps. The specific ordering of method steps is however given for illustrative purposes only and should not be construed as binding. For example, the ordering of 202 and 203 in the embodiment of FIG. 2 may be exchanged. Other changes of the ordering of method steps may be apparent to the skilled person.

Methods for controlling an electronic device, such as vital monitor and the smart phone discussed above, are described under reference of FIGS. 2, 3, 5, 6 and 7. The methods can also be implemented as a computer program causing a computer and/or a processor, such as CPU 902 and 916 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising a circuitry configured to authenticate a second electronic device when the circuitry detects based on a privacy preserving algorithm that the two electronic devices are associated with the same body.

(2) The electronic device of (1), wherein the electronic device is a wearable electronic device.

(3) The electronic device of (1) or (2), wherein the circuitry is configured to detect that the electronic device and the second electronic device are associated with the same body based on a comparison of body-related information.

(4) The electronic device of any one of (1) to (3), wherein the circuitry is configured to obtain body-related information from sensors of the electronic device.

(5) The electronic device of any one of (1) to (4), wherein the circuitry is configured to obtain body-related information from the second electronic device.

(6) The electronic device of any one of (1) to (5), wherein the circuitry is configured to communicate with the second electronic device via short range wireless communication and/or a wide range wireless communication.

(7) The electronic device of any one of (1) to (6), wherein the circuitry is configured to obtain body-related information from the second electronic device by short range wireless communication based on a privacy preserving algorithm.

(8) The electronic device of any one of (1) to (7), wherein the circuitry is configured to determine if first body-related information obtained from sensors of the electronic device and second body-related information obtained from the second electronic device match.

(9) The electronic device of any one of (1) to (8), wherein the circuitry is configured to authenticate the second electronic device if first body-related information obtained from sensors of the electronic device and second body-related information obtained from the second electronic device match.

(10) The electronic device of any one of (1) to (9), wherein the circuitry is configured to correlate first body-related information obtained from sensors of the electronic device with second body-related information obtained from the second electronic device.

(11). The electronic device of any one of (1) to (10), wherein the circuitry is configured to detect if first body-related information obtained from sensors of the electronic device and second body-related information obtained from the second electronic device relate to a common characteristic body feature.

(12) The electronic device of any one of (1) to (11), wherein the circuitry is configured to exchange body-related information with the second electronic device using the privacy preserving algorithm.

(13) The electronic device of any one of (1) to (12), wherein the circuitry is configured to exchange body-related information based on a multi-party computation algorithm.

(14) The electronic device of any one of (1) to (13), wherein the circuitry is configured to sense data representing a permanent feature and/or a current state of a user's body.

(15) The electronic device of any one of (1) to (14), wherein the electronic device is one of smart glasses, a smart watch, a smart band, a smart chain, mobile phone, tablet or any other smart device attachable to a user's body.

(16) A method comprising authenticating data communication between a first electronic device and a second electronic device when detecting based on a privacy preserving algorithm that the two electronic devices are associated with the same body.

(17) The method of (16), further comprising detecting that the first electronic device and the second electronic device are associated with the same body based on a comparison of body-related information.

(18) The method of (16) or (17), further comprising obtaining body-related information from sensors of the first electronic device.

(19) The method of any one of (16) to (18), further comprising obtaining body-related information from the second electronic device.

(20) The method of any one of (16) to (19), further comprising a communication between the first electronic device and the second electronic device via short range wireless communication based on a privacy preserving algorithm.

(21) The method of any one of (16) to (20), further comprising obtaining body-related information from the second electronic device by short range wireless communication and/or a wide range wireless communication.

(22) The method of any one of (16) to (21), further comprising determining if first body-related information obtained from sensors of the electronic device and second body-related information obtained from the second electronic device match.

(23) The method of any one of (16) to (22), further comprising authenticating data communication between the first and the second electronic device if first body-related information obtained from sensors of the first electronic device and second body-related information obtained from the second electronic device match.

(24) The method of any one of (16) to (23), further comprising correlating first body-related information obtained from sensors of the first electronic device with second body-related information obtained from the second electronic device.

(25) The method of any one of (16) to (24), further comprising detecting if first body-related information obtained from sensors of the first electronic device and second body-related information obtained from the second electronic device relate to a common characteristic body feature.

(26) The method of any one of (16) to (25), further comprising exchanging body-related information between the first electronic device and the second electronic device using the privacy preserving algorithm.

(27). The method of any one of (16) to (26), further comprising exchanging body-related information between the first electronic device and the second electronic device based on a multi-party computation algorithm.

(28) The method of any one of (16) to (27), further comprising sensing data representing a permanent feature and/or a current state of a user's body.

(29) The method of any one of (16) to (28), further comprising establishing a secure channel between the wearable device and the mobile device.

(30) A computer program comprising instructions, the instructions when executed by a processor causing the processor to authenticate data communication between a first electronic device and a second electronic device when detecting based on a privacy preserving algorithm that the two electronic devices are associated with the same body.

(31) The computer program of (30) comprising instructions, the instructions when executed by a processor causing the processor to perform the method according to any one of (17) to (29), when being carried out on a computer.

(32) A non-transitory computer-readable recording medium that stores therein a computer program product, which, when executed by a processor, causes the method according to anyone of (16) to (29) to be performed.

The present application claims priority to European Patent Application 17187072.8 filed by the European Patent Office on 21 Aug. 2017, the entire contents of which being incorporated herein by reference.

The invention claimed is:

1. An electronic device comprising:
   a first sensor configured to obtain first body-related information from a body near the first sensor; and
   a circuitry configured to:
   obtain second body-related information and a list of capabilities for sensing body-related information from a second electronic device;
   select a common capability from the list of capabilities, wherein the common capability is common to the electronic device and the second electronic device;
   calculate a first garbled circuit function of the first body-related information;
   transfer the first garbled circuit function to the second electronic device;
   obtain from the second electronic device the second body-related information in a form of a second garbled circuit function, wherein the second garbled circuit function a function of the second body-related information and the first garbled circuit function;
   calculate a correlation factor of the first body-related information and the second body-related information based on the common capability using the second garbled circuit function; and
   authenticate the second electronic device when the circuitry detects, based on a privacy preserving algorithm that compares the correlation factor with a threshold, that the electronic device and the second electronic device are associated with a same body.

2. The electronic device according to claim 1, wherein the circuitry is configured to communicate with the second electronic device via a short range wireless communication and/or a wide range wireless communication.

3. The electronic device according to claim 1, wherein the circuitry is configured to obtain the second body-related information from the second electronic device by a short range wireless communication and/or a wide range wireless communication.

4. The electronic device according to claim 1, wherein the circuitry is configured to detect if the first body-related information from the first sensor and the second body-related information obtained from the second electronic device relate to a common characteristic body feature.

5. The electronic device according to claim 1, wherein the circuitry is configured to exchange the first body-related information with the second electronic device using the privacy preserving algorithm.

6. The electronic device according to claim 1, wherein the circuitry is configured to exchange the first body-related information with the second electronic device based on a multi-party computation algorithm.

7. The electronic device according to claim 1, wherein the circuitry is configured to sense data representing a permanent feature and/or a current state of the body.

8. The electronic device according to claim 1, wherein the electronic device is one of smart glasses, a smart watch, a smart band, a smart chain, a mobile phone, or a tablet attachable to the body.

9. The electronic device of claim 1, wherein the first body-related information represents a first acceleration pattern and the second body-related information represents a second acceleration pattern, and
   wherein the circuitry is further configured to adjust the first acceleration pattern based on a position of the first sensor on the body before calculating the correlation factor.

10. The electronic device of claim 1, wherein the correlation factor has a value between 0 and 1.

11. The electronic device of claim 1, wherein the circuitry is further configured to send a second list of capabilities of the electronic device to the second electronic device.

12. A method comprising:
   obtaining first body-related information from a first sensor of a first electronic device;
   obtaining second body related information and a list of capabilities for sensing body-related information from a second electronic device;
   selecting a common capability from the list of capabilities, wherein the common capability is common to the electronic device and the second electronic device;
   calculating a first garbled circuit function of the first body-related information;
   transferring the first garbled circuit function to the second electronic device;
   obtaining from the second electronic device the second body-related information in a form of a second garbled circuit function, wherein the second garbled circuit function a function of the second body-related information and the first garbled circuit function;
   calculating a correlation factor of the first body-related information and the second body-related information based on the common capability using the second garbled circuit function;

authenticating data communication between the first electronic device and the second electronic device when a privacy preserving algorithm determines that the first body-related information matches the second body-related information and that the first electronic device and the second electronic device are associated with a same body, based on a comparison of the correlation factor with a threshold.

13. The method according to claim 12, further comprising a communication between the first electronic device and the second electronic device via short range wireless communication and/or wide range wireless communication.

14. The method according to claim 12, further comprising obtaining the second body-related information from the second electronic device by short range wireless communication and/or a wide range wireless communication.

15. The method according to claim 12, further comprising detecting if the first body-related information obtained from the first sensor and the second body-related information obtained from the second electronic device relate to a common characteristic body feature.

16. The method according to claim 12, further comprising exchanging the first and the second body-related information between the first electronic device and the second electronic device using the privacy preserving algorithm.

17. The method according to claim 12, further comprising exchanging the first and the second body-related information between the first electronic device and the second electronic device based on a multi-party computation algorithm.

18. The method according to claim 12, further comprising sensing data representing a permanent feature and/or a current state of the body.

19. The method according to claim 12, further comprising establishing a secure channel between the first electronic device and the second electronic device.

* * * * *